(12) United States Patent
Kusakabe

(10) Patent No.: US 10,733,423 B2
(45) Date of Patent: Aug. 4, 2020

(54) IMAGE PROCESSING APPARATUS, IMAGE PROCESSING METHOD, AND STORAGE MEDIUM

(71) Applicant: CANON KABUSHIKI KAISHA, Tokyo (JP)

(72) Inventor: Minoru Kusakabe, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 192 days.

(21) Appl. No.: 15/809,215

(22) Filed: Nov. 10, 2017

(65) Prior Publication Data

US 2018/0137344 A1    May 17, 2018

(30) Foreign Application Priority Data

Nov. 15, 2016  (JP) .................................. 2016-222144

(51) Int. Cl.
*G06K 9/00* (2006.01)
*G06K 9/46* (2006.01)
*G06K 9/62* (2006.01)

(52) U.S. Cl.
CPC ..... *G06K 9/00281* (2013.01); *G06K 9/00234* (2013.01); *G06K 9/00248* (2013.01); *G06K 9/00288* (2013.01); *G06K 9/00295* (2013.01); *G06K 9/4609* (2013.01); *G06K 9/4652* (2013.01); *G06K 9/6202* (2013.01); *G06K 2009/00322* (2013.01)

(58) Field of Classification Search
CPC ........... G06K 9/00288; G06K 9/00362; G06K 9/00771; G06K 2209/01
USPC ........ 382/115, 117, 118, 125, 128, 209, 224, 382/278, 282; 340/5.81, 5.82, 5.83
See application file for complete search history.

(56) References Cited

U.S. PATENT DOCUMENTS

| | | | | |
|---|---|---|---|---|
| 6,904,163 B1* | 6/2005 | Fujimura | .............. | G06T 7/0012 378/162 |
| 7,054,468 B2* | 5/2006 | Yang | .................. | G06K 9/00275 345/16 |
| 7,127,087 B2* | 10/2006 | Huang | ............... | G06K 9/00228 382/118 |
| 7,522,773 B2* | 4/2009 | Gallagher | .......... | G06K 9/00288 382/118 |
| 8,086,867 B2* | 12/2011 | Freeman | .............. | G06Q 20/341 380/28 |

(Continued)

FOREIGN PATENT DOCUMENTS

| | | |
|---|---|---|
| JP | 2004252511 A | 9/2004 |
| JP | 2012018593 A | 1/2012 |

*Primary Examiner* — Yosef Kassa
(74) *Attorney, Agent, or Firm* — Canon U.S.A., Inc. IP Division

(57) ABSTRACT

An image processing apparatus includes an object detection unit configured to detect objects from a plurality of images captured at different times, based on a degree of matching with a predetermined criterion, a determination unit configured to determine whether the objects detected by the object detection unit include an object that is the same object as an object detected within an image captured at another time, and an attribute detection unit configured to perform processing for extracting one or more object images, based on the degree of matching, from a plurality of object images corresponding to the object determined to be the same object by the determination unit, and detecting an attribute of the same object with respect to the extracted one or more object images.

24 Claims, 5 Drawing Sheets

(56) References Cited

U.S. PATENT DOCUMENTS

| | | | | |
|---|---|---|---|---|
| 8,155,398 B2* | 4/2012 | Togashi | ............. | G06K 9/00268 |
| | | | | 382/118 |
| 8,295,568 B2* | 10/2012 | Sakaida | ............... | A61B 5/7435 |
| | | | | 382/128 |
| 8,331,632 B1* | 12/2012 | Mohanty | ............ | G06K 9/00288 |
| | | | | 382/115 |
| 8,358,811 B2* | 1/2013 | Adams | ............... | G06K 9/00221 |
| | | | | 382/118 |
| 8,504,739 B2* | 8/2013 | Aull | ........................ | G06F 9/544 |
| | | | | 710/62 |
| 8,509,497 B2* | 8/2013 | Ego | ...................... | G06K 9/6227 |
| | | | | 382/103 |
| 9,147,128 B1* | 9/2015 | Chafni | ............... | G06K 9/00288 |

* cited by examiner

IMAGE PROCESSING APPARATUS, IMAGE PROCESSING METHOD, AND STORAGE MEDIUM

BACKGROUND

Field of the Disclosure

The present disclosure relates to an image processing apparatus, an image processing method, a storage medium, and an image processing system for detecting a feature of an object within an image.

Description of the Related Art

In recent years, a face authentication technique for analyzing a feature of a specific object, such as a person's face, in a captured image, and estimating whether a person is the same person as a person whose face image is preliminarily designated, and a technique for estimating person attributes (e.g., age and gender of a person) have been applied to monitoring cameras and the like.

To analyze a feature of a person's face within an image, it is generally necessary to use a face image captured from the front as much as possible. However, it is difficult for even a monitoring camera installed to face an entrance of a building or the like to always acquire a face image captured from the front, because a person passing through the entrance may turn the person's head away. Accordingly, it is desirable to select an image of a person facing the front as much as possible to analyze a feature of the image.

In addition, Japanese Patent Application Laid-Open No. 2004-252511 discusses a technique for estimating the direction of a face based on a position shift amount of a face organ feature point extracted as a result of performing feature amount extraction processing on a face region after detecting a face within an image.

In this case, in order to capture an image of a moving object as viewed from a predetermined direction, for example, an image of a moving person's face that faces the front, it is necessary to increase an image capturing frame rate so that the image of the person can be captured at about the moment when the person faces the front. However, when a plurality of persons is captured within an image, processing for analyzing a feature of a face is executed a number of times equal to the number of the faces of the plurality of persons. As in the technique discussed in Japanese Patent Application Laid-Open No. 2004-252511, when feature extraction processing is executed on all the faces detected in the image, it is necessary to perform processing for extracting a number of face organ feature amount points equal to the number of the faces captured in one frame. Accordingly, if a large number of faces are captured in one frame, the extraction processing cannot follow up the frame rate. This results in an issue that it is difficult to acquire a feature of a face facing the front.

SUMMARY

The present disclosure is directed to enabling appropriate execution of processing associated with feature detection of a specific object.

According to an aspect of the present disclosure, an image processing apparatus includes an object detection unit configured to detect objects from a plurality of images captured at different times, based on a degree of matching with a predetermined criterion, a determination unit configured to determine whether the objects detected by the object detection unit include an object that is the same object as an object detected within an image captured at another time, and an attribute detection unit configured to perform processing for extracting one or more object images, based on the degree of matching, from a plurality of object images corresponding to the object determined to be the same object by the determination unit, and detecting an attribute of the same object with respect to the extracted one or more object images.

Further features of the present disclosure will become apparent from the following description of exemplary embodiments with reference to the attached drawings.

DESCRIPTION OF THE EMBODIMENTS

An exemplary embodiment of the present disclosure will be described in detail below with reference to the accompanying drawings.

An image processing apparatus according to the present exemplary embodiment detects, from a captured image or the like, only an image region of a specific object as viewed from a predetermined direction, and detects features of only the detected image region. In the present exemplary embodiment, only an image region of the face of a person facing the front (hereinafter referred to as a face region) is detected as an image of a specific object as viewed from a predetermined direction, and features of the face region are detected. Image processing according to the present exemplary embodiment will be described in detail below by using an example in which a face region of a person facing the front is detected from a captured input image or the like, and features of the face region are detected.

Figure 1:
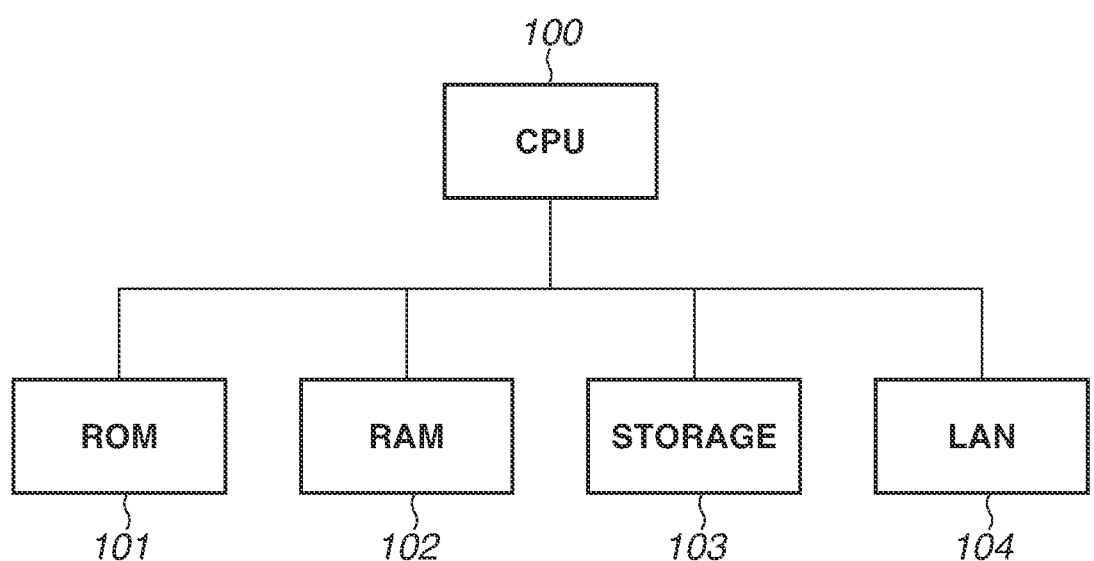
FIG. 1 is a diagram illustrating a schematic configuration of an image processing apparatus according to one or more aspects of the present disclosure.

FIG. 1 is a diagram illustrating a schematic configuration example of a computer as an example of an image processing apparatus according to one or more aspects of the present disclosure.

Referring to FIG. 1, a CPU 100 is a central processing unit that controls the overall operation of the computer. A RAM 102 is a volatile memory and temporarily stores programs, image data, and the like. A ROM 101 is a non-volatile memory and stores a program for starting the CPU 100, various initialization data, and the like. A storage 103 is a recording device having a capacity larger than that of the RAM 102. The storage 103 is, for example, a hard disk drive (HDD) or a solid state drive (SSD). The storage 103 stores an operating system (OS) executed by the CPU 100, an image processing program according to the present exemplary embodiment, various data, and the like. The storage 103 can also record captured image data and image data and the like acquired via a network or the like. The CPU 100 executes a start-up program stored in the ROM 101 at the time of start-up, for example, when a power supply is turned on. This start-up program reads out the OS stored in the storage 103, and develops the OS in the RAM 102. When an instruction for starting the image processing according to the present exemplary embodiment is sent from a user via an operating unit or the like, which is not illustrated, after the OS is started, the CPU 100 reads out the image processing program according to the present exemplary embodiment from the storage 103 and develops the image processing program in the RAM 102. As a result, the CPU 100 is brought into a state capable of executing the image processing according to the present exemplary embodiment. Further, the CPU 100 stores various data used for operating the image processing program according to the present exemplary embodiment in the RAM 102 and reads and writes the data. A LAN 104 is an interface for a local area network. The LAN 104 performs, for example, communication with a network camera, another computer, and the like. The image processing program according to the present exemplary embodiment may be acquired via the LAN 104. Image data treated in the image processing according to the present exemplary embodiment may also be acquired via the LAN 104.

Figure 2:
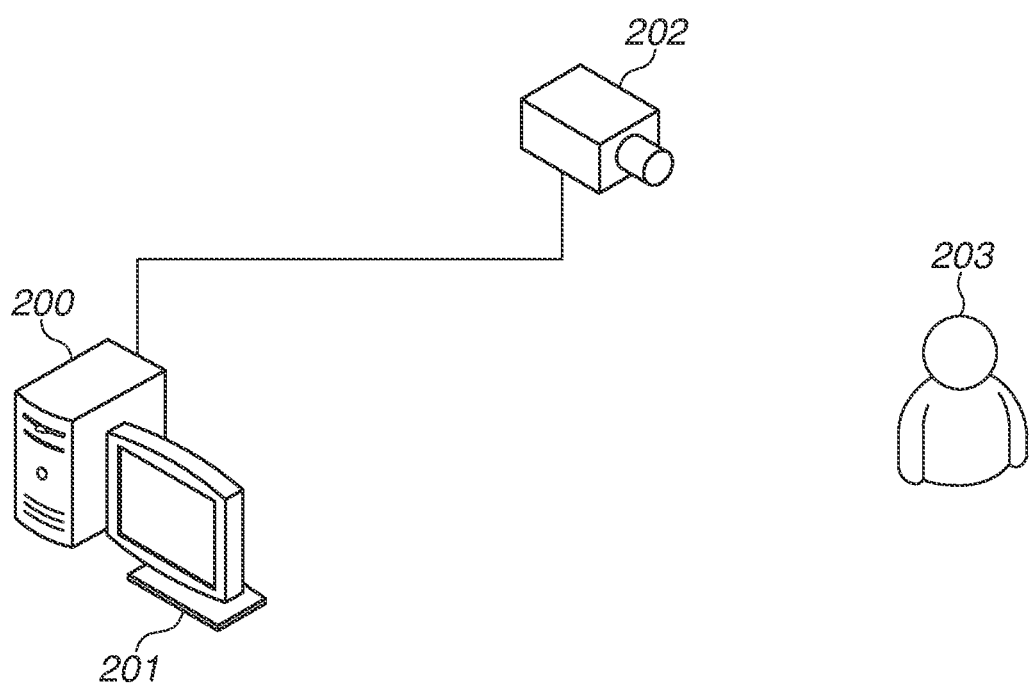
FIG. 2 is a diagram illustrating an application example of an image processing system according to one or more aspects of the present disclosure.

FIG. 2 is a diagram illustrating a schematic application example of an image processing system according to one or more aspects of the present disclosure. A computer 200 has the configuration illustrated in FIG. 1. A display 201 is a display device that is connected to the computer 200 and is used for a user (operator), which is not illustrated, to, for example, perform browsing when the user operates the computer 200. A camera 202 is, for example, a network camera, and has a function of capturing images within a photographing range and transmitting the captured image data to the computer 200 via a network. An object 203 is a subject present in the photographing range of the camera 202. In the present exemplary embodiment, the object 203 is a person (hereinafter referred to as a person 203). Accordingly, assume that the image of the person 203 is in the image captured by the camera 202.

The present exemplary embodiment assumes that a monitoring camera is used as the camera 202, but the camera 202 is not limited to the monitoring camera. For example, the computer 200 may be connected to a digital still camera, a digital video camera, a smartphone or a tablet terminal including a camera function, an industrial camera, an in-vehicle camera, a wearable camera, or the like. The computer 200 and the camera 202 may be connected to each other using, for example, a USB, instead of using a network device such as the LAN 104 illustrated in FIG. 1. In the present exemplary embodiment, a target (specific object) captured by the camera 202 is a person or the like in the photographing range of the monitoring camera, but the target is not limited to this. Examples of the target may include various vehicles travelling on a road or the like, parts or products being conveyed on a conveyor in a factory, and animals. While the present exemplary embodiment illustrates an example in which an image captured by the camera 202 is transmitted to the computer 200, the captured image may be temporarily stored in a storage device or the like of another computer and the computer may transmit the image to the computer 200 illustrated in FIG. 2.

Figure 3:
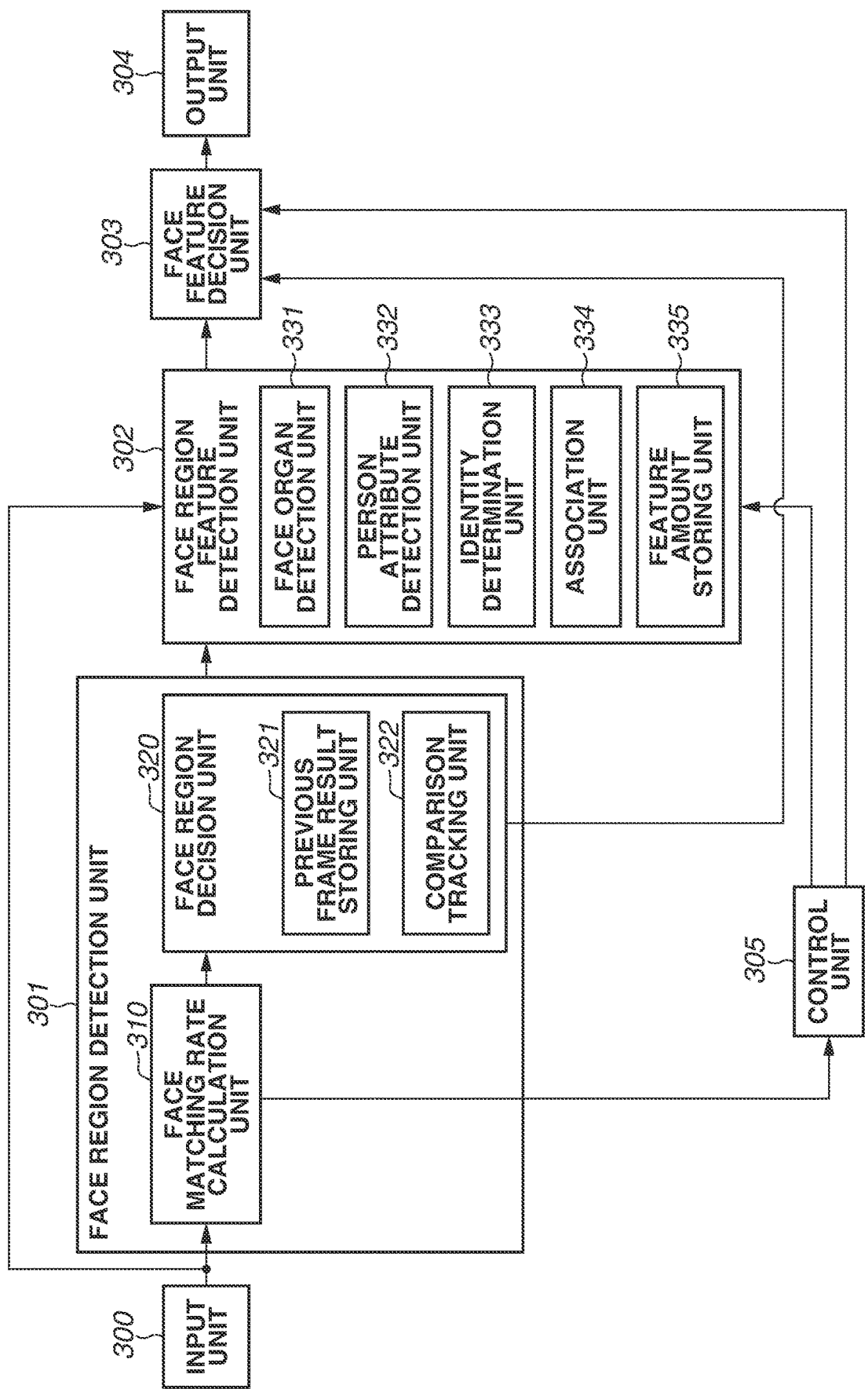
FIG. 3 is a diagram illustrating a functional block configuration of the image processing apparatus according to one or more aspects of the present disclosure.

FIG. 3 is a diagram illustrating, as functional blocks, software modules formed by the CPU 100 executing the image processing program according to one or more aspects of the present disclosure. In FIG. 3, each software module is represented as a functional block. Each of the functional blocks may be formed of a hardware module. Instead of forming all the functional blocks using a software module or a hardware module, some of the functional blocks may be formed of a software module, and the other functional blocks may be formed of a hardware module.

In FIG. 3, an input unit 300 acquires an input image. In the present exemplary embodiment, the input unit 300 acquires, for example, an image captured by the camera 202 illustrated in FIG. 2, an image read from the storage 103, an image received via the LAN 104, and the like. In the present exemplary embodiment, an example in which an input image is formed of frames of a moving image is described. The input unit 300 acquires the frames of the moving image in the order of the frames. Data on the input image acquired by the input unit 300 is sent to a face region detection unit 301 and a face region feature detection unit 302.

The face region detection unit 301 includes a face matching rate calculation unit 310 (hereinafter referred to as a calculation unit 310) and a face region decision unit 320 (hereinafter referred to as a region decision unit 320).

The calculation unit 310 scans the inside of the input image using a preset index (criterion), and calculates a value indicating a degree of matching with the index for each image region within the input image. In the present exemplary embodiment, the index to be used is a template for detecting the image region (face region) of the front face, for example. The calculation unit 310 scans the inside of the input image using the template, and calculates a value indicating a degree of matching with the index (template) for each image region. Examples of the template according to one or more aspects of the present disclosure will be described below with reference to FIGS. 5A, 5B, 5C, 5D, and 5E. The value indicating the degree of matching is a value indicating a matching rate in template matching, and is thus hereinafter referred to as a matching rate. As described above, the calculation unit 310 scans the inside of the input image based on the preset index to obtain the matching rate with respect to the index for each image region within the input image, and calculates the matching rate for each image region. The matching rate calculated by the calculation unit 310 corresponds to a value indicating a likelihood that each image region within the input image is a person's face region. For example, there is a possibility that an image region having a matching rate that is low to some extent is not a person's face region. On the other hand, it is highly likely that an image region having a high matching rate is a person's face region. Processing to be executed by the calculation unit 310 is template matching processing on the input image. Accordingly, load of the processing is extremely lower as compared with a case where, for example, detailed feature detection processing for the face region is executed on the entire area of the input image, and thus the processing can be achieved with a high speed. The input image and information about the matching rate calculated for each image region by the calculation unit 310 are sent to the region decision unit 320. The information about the matching rate calculated for each image region by the calculation unit 310 is also sent to a control unit 305.

The control unit 305 controls, according to the matching rate, at least one of below-described feature detection processing on the face region by the face region feature detection unit 302 (hereinafter referred to as a feature detection unit 302) and below-described feature decision processing on the face region by a face feature decision unit 303 (hereinafter referred to as a feature decision unit 303).

The region decision unit 320 included in the face region detection unit 301 decides, based on the matching rate calculated for each image region by the calculation unit 310, only a plurality of image regions considered to be person's face images, from among a plurality of image regions within the input image, as each of them is a face region. For example, the region decision unit 320 decides, based on the matching rate calculated in the calculation unit 310, only a plurality of image regions each having a position and a size whose likelihood of a person's face image is high, within the input image, as each of them is a face region. Specific examples of processing for detecting face regions based on the matching rate will be described with reference to FIGS. 5A, 5B, 5C, 5D, and 5E described below. Information indicating the plurality of face regions decided by the region decision unit 320 is sent to the feature detection unit 302.

In the present exemplary embodiment, an example in which a plurality of frames of a moving image is input as an image is described. For example, in the case of a moving image with a high frame rate, the person 203 of the same subject illustrated in FIG. 2 may appear over a plurality of frames. In such a case, for example, the result of the face region in the previous frame is stored, and the face region in the previous frame is compared with the face region in the current frame, thereby enabling tracking and identification of the same person. Accordingly, the region decision unit 320 illustrated in FIG. 3 includes a previous frame result storing unit 321 (hereinafter referred to as a result storing unit 321) and a comparison tracking unit 322. The result storing unit 321 stores data on the face region decided in the frame of the input image, and sends, to the comparison tracking unit 322, the stored data on the face region as a comparison target (data on the face region decided in the previous frame) when the image in the next frame is input. The comparison tracking unit 322 compares the face region decided in the current frame with the face region which is decided in the previous frame and stored in the result storing unit 321, thereby performing identification processing for determining whether the face regions are identified as the same person's face region (whether there is a possibility that the face regions are identified as the same person's face region). When the comparison tracking unit 322 identifies the face regions as the same person's face region, the comparison tracking unit 322 performs processing for tracking the same person's face region between the frames. Information indicating the results of identification and tracking by the comparison tracking unit 322 is sent to the feature detection unit 302 and the feature decision unit 303 that is described below.

The feature detection unit 302 detects, in the input image, detailed features of each face only in the plurality of face regions decided by the region decision unit 320. The feature detection unit 302 includes a face organ detection unit 331, a person attribute detection unit 332, an identity determination unit (identification unit) 333, an association unit 334, and a feature amount storing unit 335. The face organ detection unit 331 performs face organ detection processing for detecting the detailed size, position, and the like of face parts (face organs), such as eyes, a nose, and a mouth, for each face region decided by the region decision unit 320. The identity determination unit 333 determines whether the person is the same person as a person in other preliminarily input face images for each face region decided by the region decision unit 320, based on the result of face organ detection, the result of tracking processing by the comparison tracking unit 322, and the result of analyzing other features. The person attribute detection unit 332 estimates person attributes, such as the age, gender, and race of a person in each face region for each face region decided by the region decision unit 320, based on the result of face organ detection, the color or texture of each face region, the positions of wrinkles and the like, the result of performing other analysis processing, and the like. Note that there are other various methods for detecting person attributes such as the age, gender, race, and the like of a person. Any of such methods may be used. The feature amount obtained by the feature detection processing of the feature detection unit 302 is not limited to the above-described example. The feature amount may be obtained by other various feature detection processing. In the present exemplary embodiment, information obtained by face organ detection processing, identity determination processing, and person attribute detection processing for each of the face regions is used as the feature amount detected for each face region by the feature detection unit 302. Further, the feature detection processing by the feature detection unit 302 is performed only on the face regions decided by the region decision unit 320. Accordingly, load of the processing can be reduced to be very lower as compared with a case where, for example, the feature detection processing is performed on the entire area of the input image, and thus the processing can also be achieved with a high speed. The association unit 334 associates the feature amounts, which are detected for each face region by the face organ detection unit 331, the person attribute detection unit 332, and the identity determination unit 333, with the matching rates for the face regions, respectively. The feature amount storing unit 335 stores association information obtained by associating the matching rates with the feature amounts of the face regions, respectively. Further, the feature detection unit 302 sends, to the feature decision unit 303, the association information and the feature amounts for a plurality of face regions detected as described above.

The feature detection unit 302 need not necessarily include both the person attribute detection unit 332 and the identity determination unit 333, and may include only one of the person attribute detection unit 332 and the identity determination unit 333. Alternatively, the feature detection unit 302 may include a component other than the person attribute detection unit 332 and the identity determination unit 333, such as a component having another detection processing for desirably analyzing a front face.

The feature decision unit 303 performs feature output processing, such as a calculation of a feature amount for a face region that is finally output, under the control of the control unit 305 based on the feature amounts of the plurality of face regions detected by the feature detection unit 302 and the matching rates associated with the feature amounts, respectively. For example, the feature decision unit 303 adopts, as the feature amount of the face region finally output, the feature amount of the face region with a maximum matching rate among the feature amounts of the plurality of face regions. Further, for example, a value obtained by averaging N (N is a predetermined number) feature amounts with higher matching rates, or a value obtained by weighted averaging the feature amounts using a matching rate as a weight, may be calculated as the feature amount of the face region finally output. These values are merely examples. Various calculation values for obtaining the feature amount of each face region based on a matching rate may be used as the feature amount of the face region finally output. In the feature decision unit 303, a plurality of face regions of the same person may be identified based on the results of identification and tracking of the same person in a plurality of frames by the comparison tracking unit 322, and the feature amount of the face region finally output may be decided according to the matching rate from among the plurality of face regions of the same person. In this manner, the feature decision unit 303 according to the present exemplary embodiment performs processing for deciding the feature amount of the face region finally output based on the information about the feature amount of the face region and the matching rate, i.e., feature amount output control processing based on the matching rate.

An output unit 304 outputs, to a subsequent-stage component (not illustrated), the information about the feature amount of each face region decided by the feature decision unit 303. In the subsequent-stage component (not illustrated), for example, face authentication processing is performed based on the feature of the face region output from the image processing apparatus according to the present exemplary embodiment.

Figure 4:
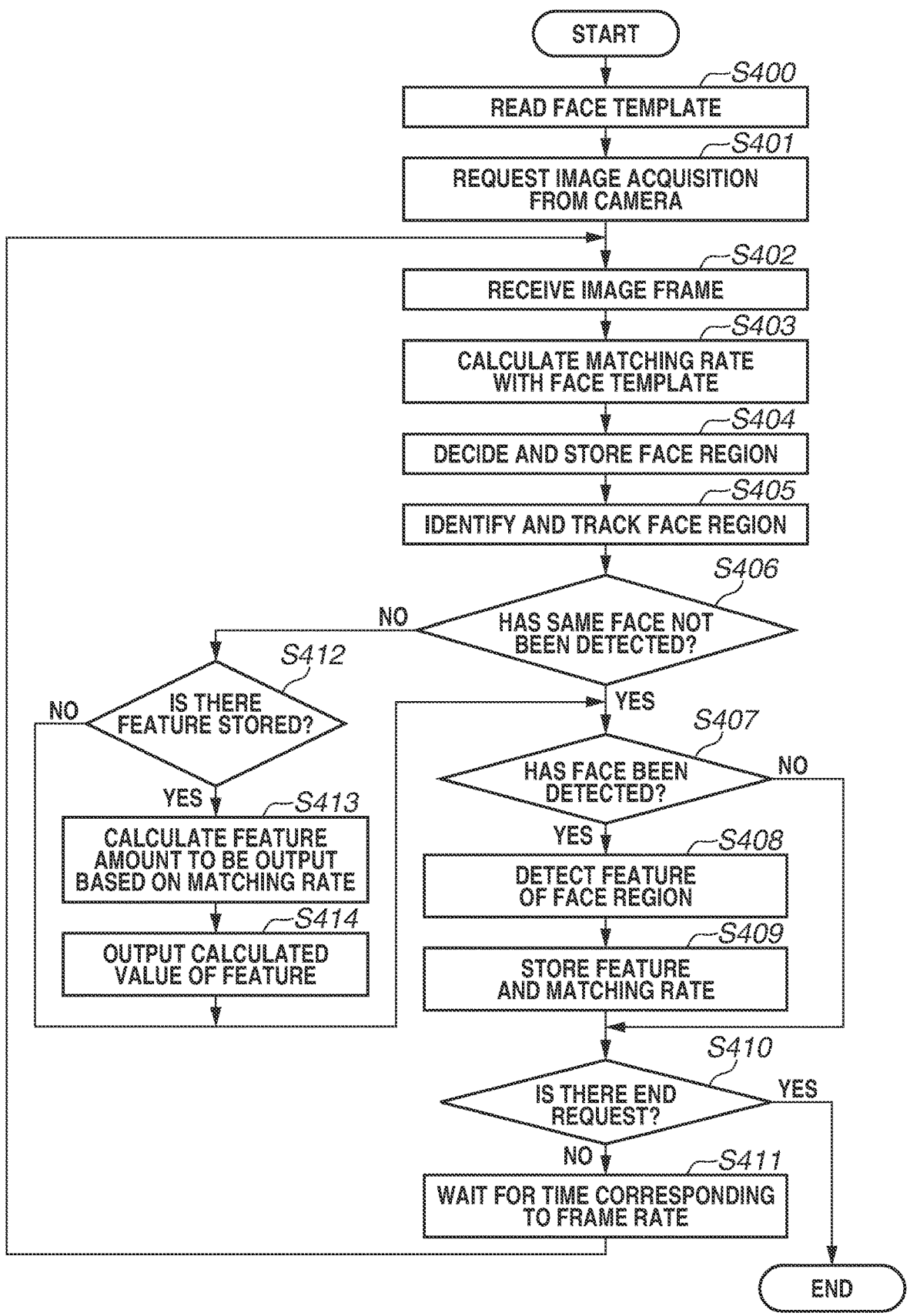
FIG. 4 is a flowchart illustrating a flow of image processing according to one or more aspects of the present disclosure.

FIG. 4 is a flowchart illustrating a flow of processing performed by the CPU 100 illustrated in FIG. 1 executing the image processing program according to one or more aspects of the present disclosure. Processing of the flowchart illustrated in FIG. 4 is mainly performed by the functional blocks illustrated in FIG. 3. A part (e.g. step S410) of the processing is performed by a function of the CPU 100 which is not illustrated in FIG. 3.

In step S400, the input unit 300 reads, from the storage 103 or the RAM 102, data on a preset template, which is used as a reference for comparison during the face detection processing, thereby obtaining the data. The data on the template may be preliminarily stored in the storage 103 or the like, or may be generated by executing the image processing program according to the present exemplary embodiment and stored in the RAM 102. The number of templates acquired in step S400 is not limited to one. The template may be formed of a group of a plurality of templates. After step S400, the input unit 300 causes the processing to proceed to step S401.

In step S401, the input unit 300 requests the camera 202 illustrated in FIG. 2 to transmit a captured image. Further, in step S402, the input unit 300 receives the data on the frames captured by the camera 202. The input unit 300 may acquire image data from the storage 103. After step S402, the processing of the CPU 100 proceeds to step S403. Processing in step S403 is performed by the calculation unit 310 of the region detection unit 301.

In step S403, the calculation unit 310 scans the inside of the input image of each frame by using the template acquired in step S400, and calculates the matching rate for each of the plurality of image regions with respect to the template. Note that in step S403, the template may be directly applied for comparison. However, for example, if the input image of each frame or the template is used after the input image or the template is enlarged or reduced or rotated, a case where the appearance of a face within an image is unclear and the size and direction of the face are not identified can also be dealt with. After step S403, the processing of the CPU 100 proceeds to step S404. Processing in step S404 is performed by the region decision unit 320.

In step S404, the region decision unit 320 decides, based on the matching rate calculated by the calculation unit 310, the face region indicating the position that is estimated to be a face, the size of the face, or the like within each frame. In addition, the result storing unit 321 of the region decision unit 320 stores the data on the face region decided in the current frame. After step S404, the region decision unit 320 causes the processing to proceed to step S405. Processing in step S405 is performed by the comparison tracking unit 322.

In step S405, the comparison tracking unit 322 compares the face region decided in the previous frame that is stored in the result storing unit 321 with the face region decided based on the current frame. Further, the comparison tracking unit 322 performs identification processing for determining whether the face region decided in the current frame is the same as the face region decided in the previous frame, i.e., identification processing for determining whether the face is the same person's face, and tracks the face when the face region is identified as the same person's face region. The comparison performed in the comparison tracking unit 322 is not a comparison performed based on the detailed features of the face image, but instead a simple comparison. More specifically, the comparison is implemented by processing for comparing the position and size of the face region. In other words, when the position and size of the face region decided in the previous frame are similar to the position and size of the face region decided in the current frame, the comparison tracking unit 322 determines that these face regions are the same person's face region. After step S405, the processing of the CPU 100 proceeds to step S406. Processing in step S406 is performed by the feature detection unit 302.

In step S406, the feature detection unit 302 determines whether the face region decided in the previous frame has not been detected from the current frame based on the results of identification and tracking by the comparison tracking unit 322. If it is determined in step S406 that the same face has not been detected (NO in step S406), the processing of the CPU 100 proceeds to step S412. Processing in step S406 is performed by the feature decision unit 303. On the other hand, if it is determined in step S406 that the same face has been detected (YES in step S406), the feature detection unit 302 causes the processing to proceed to step S407.

In step S407, the feature detection unit 302 determines whether the face region has been detected in the current frame. If it is determined in step S406 that the same face has been detected (YES in step S406) and the processing proceeds to step S407, it is determined in step S407 that the face region has been detected in the current frame (YES in step S407) and the processing of the feature detection unit 302 proceeds to step S408. On the other hand, if it is determined in step S407 that the face region has not been detected (NO in step S407), the processing of the CPU 100 proceeds to step S410. Note that when the processing proceeds to step S412, which is described below, from step S406, it may be determined in step S407 that the face region has not been detected, and the processing of step S412 and subsequent steps will be described below.

In step S408, the feature detection unit 302 performs feature detection processing for each face region detected from the current frame, and obtains the feature amount for each face region. As illustrated in FIG. 3, the feature detection unit 302 includes the face organ detection unit 331, the person attribute detection unit 332, the identity determination unit 333, the association unit 334, and the feature amount storing unit 335. The processing of step S408 is performed by, for example, the face organ detection unit 331, the person attribute detection unit 332, and the identity determination unit 333, among those components. In step S408, the face organ detection unit 331 performs face organ detection processing for detecting the detailed size, position, and the like of face parts, such as eyes, a nose, a mouth, for each face region detected from the current frame by the region detection unit 301. Further, in step S408, the identity determination unit 333 performs identity determination processing for determining whether the face regions detected from the current frame are the same as a preliminarily input specific person's face image by using the result of the face organ detection processing by the face organ detection unit 331 and the like. In step S408, the person attribute detection unit 332 detects person attributes, such as the age, gender, and race of a person, based on the result of face organ detection, the result of analyzing the color, texture, and the like of each face region, and the like. Both the identity determination processing and the person attribute detection processing may be performed, or one of the identity determination processing and the person attribute detection processing may be performed. To more simplify the processing, both the identity determination processing and the person attribute detection processing may be omitted. After the feature detection unit 302 performs the feature detection processing on each face region in step S408, the processing proceeds to step S409.

Processing in step S409 is performed by, for example, the association unit 334 and the feature amount storing unit 335, among the components of the feature detection unit 302. In step S409, the association unit 334 associates the feature amount detected for each of the face regions in step S408 with the matching rate calculated for each of the face regions by the calculation unit 310 in step S403. Further, the feature amount storing unit 335 stores the association information obtained by associating the feature amounts of the face regions with the matching rates, respectively. After step S409, the CPU 100 causes the processing to proceed to step S410.

In step S410, the CPU 100 determines whether an instruction of a processing end request is supplied from the user through an operation unit or the like which is not illustrated. If it is determined that the end request is supplied (YES in step S410), the processing of the flowchart illustrated in FIG. 4 is ended. On the other hand, if the CPU 100 determines that the end request is not supplied (NO in step S410), the processing proceeds to step S411. Processing in step S411 is performed by the input unit 300. In step S411, the input unit 300 waits for a time corresponding to the frame rate of the moving image, or waits until the next frame is received, and then returns the processing to step S402. Thus, the input unit 300 receives data on the next frame in step S402. For example, when a timing for transmitting and receiving an image for each frame rate is performed on an image transmission side, such as a camera, the process of step S411 is unnecessary. In this case, the input unit 300 waits until the next frame is received in step S402. When the next frame is received, the processing of the CPU 100 proceeds to step S403 and subsequent steps.

Next, a case where it is determined in step S406 described above that the same face region decided in the previous frame has not been detected from the current frame (NO in step S406) and the processing proceeds to step S412 will be described. Processing in step S412 is performed by the feature decision unit 303 under the control of the control unit 305. In step S412, the feature decision unit 303 determines whether the feature amounts that are associated with the matching rates in step S409 described above and are stored in the feature amount storing unit 335 include a feature amount that is not output. If it is determined in step S412 that there is no feature amount that is not output (NO in step S412), the processing of the CPU 100 proceeds to step S407 described above and subsequent steps. On the other hand, if it is determined in step S412 that there is a feature amount that is not output (YES in step S412), the feature decision unit 303 causes the processing to proceed to step S413.

In step S413, the feature decision unit 303 calculates the feature amount finally output under the control of the control unit 305 based on the feature amounts for each face region stored in the feature amount storing unit 335, and the matching rates associated with the feature amounts, respectively. For example, as described above, in step S413, the feature decision unit 303 performs processing using the feature amount with a maximum matching rate, processing for calculating an average value of N feature amounts with higher matching rates, processing for calculating a weighted average value of the feature amounts using each of the N higher matching rates as a weight. For example, in step S413, the feature decision unit 303 may obtain the feature amount finally output based on the person attributes, such as the age, gender, and race, for each face region detected in the person attribute detection unit 332 of the feature detection unit 302 in step S404, and the matching rate associated with each face region. Further, in step S413, the feature decision unit 303 may decide the feature amount of the face region finally output based on the matching rate from a plurality of face regions of the same person identified based on the results of identification and tracking in a plurality of frames in step S405. The processing of step S413 is not limited to these examples. Other processes based on the matching rate may be performed. After step S413, as the process in step S414, the feature decision unit 303 sends information about the feature amount of the face region decided in step S413 to the output unit 304. Accordingly, the output unit 304 outputs the feature amount of the face region to the subsequent-stage component which is not illustrated. After step S414, the processing of the CPU 100 proceeds to step S407 described above and subsequent steps.

If it is determined in step S412 that there is no feature amount that is not output (NO in step S412) and the processing proceeds to step S407, or when the processing proceeds to step S407 after the processing of step S414, the feature detection unit 302 determines in step S407 whether the face region has been detected in the current frame in a similar manner as described above. If the feature detection unit 302 determines in step S407 that the face region has been detected in the current frame, the processing proceeds to step S408 described above and subsequent steps. In this case, in step S408, the above-described feature amount detection processing is performed on the face region detected in the current frame, i.e., on the face region that is not present in the previous frame and is newly detected in the current frame. Further, in the next step S409, the matching rate is associated with the feature amount of the detected face region in a similar manner as described above, and the matching rate associated with the feature amount is stored.

An example of calculating a matching rate between a template for face detection processing acquired in step S400 and a template for the image region (face region) within the input image will be described below with reference to FIGS. 5A, 5B, 5C, 5D, and 5E.

Figure 5A:
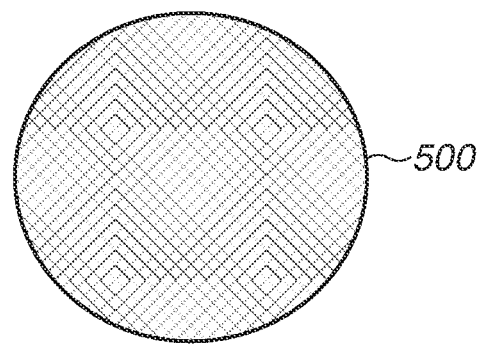
FIGS. 5A, 5B, 5C, 5D, and 5E are diagrams illustrating face detection and a matching rate according to one or more aspects of the present disclosure.

FIG. 5A is a diagram illustrating an example of a template 500 for face detection processing acquired in step S400. In the present exemplary embodiment, the template 500 has a shape (a circular shape in this example) which is similar to the shape in the vicinity of the head of a person. There are several methods for detecting a person from an input image depending on an intended use. In order to detect features of a face like in the present exemplary embodiment, it is desirable to detect a face region obtained when the person faces the front so that the features of the face can be easily determined. Accordingly, the present exemplary embodiment uses the template 500 having a shape similar to the shape in the vicinity of the head of the person when the person's face faces the front as illustrated in FIG. 5A.

The calculation unit 310 of the region detection unit 301 scans the inside of the input image while performing matching processing using the template 500 illustrated in FIG. 5A in step S403 of FIG. 4, and obtains the matching rate with the template 500 in each image region within the input image. Further, the region decision unit 320 determines that there are face images (face regions) in the image regions in which the matching rate, which is obtained for each image region in the input image, is equal to or higher than a predetermined matching rate, and decides the face images as the detected face regions.

Further, since the present exemplary embodiment aims to detect features of a person's face as described above, the template 500 illustrated in FIG. 5A is formed by taking into consideration the shape of the face of a person facing the front and the skin color of the person. Accordingly, in the case of using the template 500 illustrated in FIG. 5A, the matching rate of the face image (front face) when the person faces the front is different from the matching rate of the face image (oblique face) when the person faces obliquely, and the matching rate increases toward the front face. Even when the shape of the template 500 substantially matches the shape of the image region, the area occupied by the skin color component in the image region is small, the matching rate is lowered.

Figure 5B:
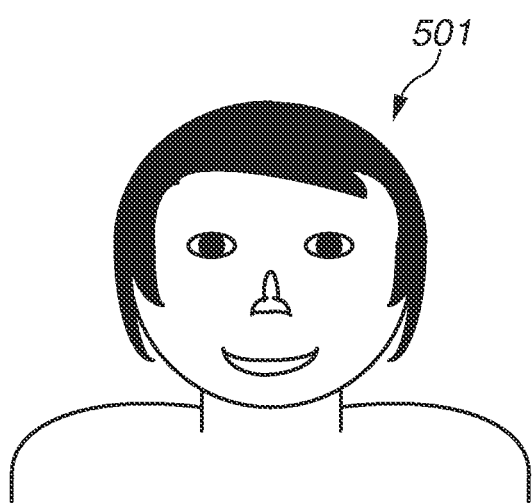
Figure 5C:
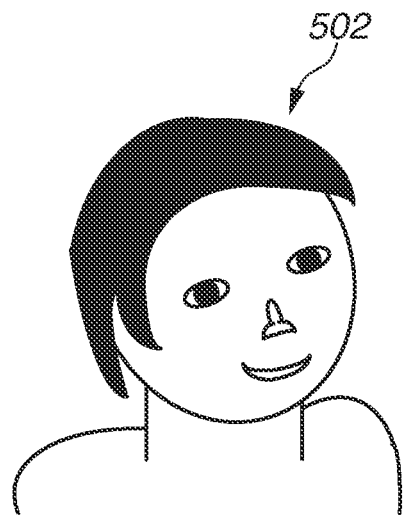
Figure 5D:
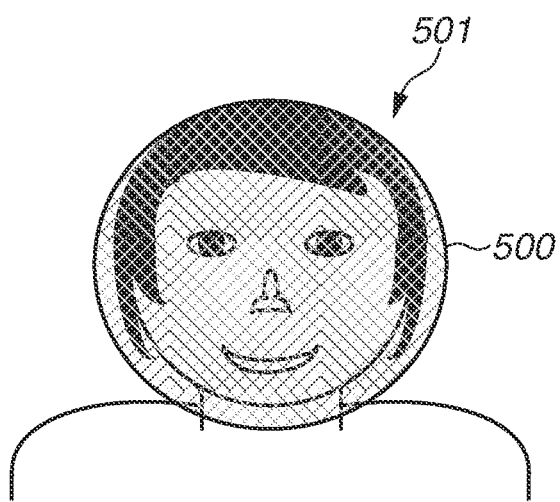
Figure 5E:
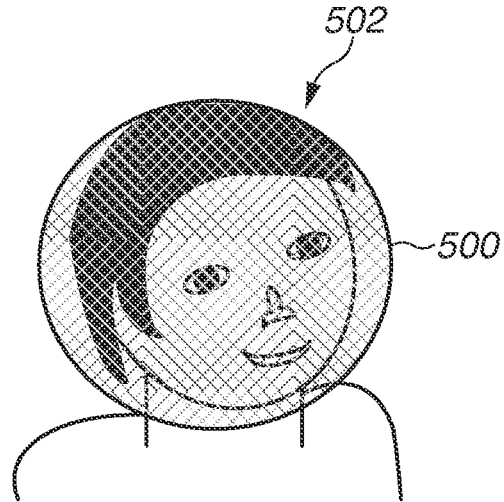

For example, FIG. 5B illustrates a person image 501 obtained when the person 203 is captured from the front by the camera 202 illustrated in FIG. 2 described above. On the other hand, FIG. 5C illustrates a person image 502 obtained by capturing the person 203 obliquely by the camera 202 illustrated in FIG. 2. In the case of the person image 501 illustrated in FIG. 5B, as illustrated in FIG. 5D, when the shape of the head of the person image 501 substantially matches the shape of the template 500 illustrated in FIG. 5A and the area occupied by the skin color component is large. On the other hand, in the case of the person image 502 illustrated in FIG. 5C, as illustrated in FIG. 5E, the area occupied by the skin color component is large to some extent but is smaller than that illustrated in FIG. 5D, and the shape of the head of the person image 502 is slightly different from the shape of the template 500. More specifically, when FIG. 5D is compared with FIG. 5E, the person image 501 illustrated in FIG. 5D substantially matches the shape of the template 500 and the area occupied by the skin color component is larger. Accordingly, the matching rate of the person image 501 illustrated in FIG. 5D is higher than the matching rate of the person image 502 illustrated in FIG. 5E.

In the case of detecting the skin color component as described above, a color that is different from the typical skin color may be included in consideration of the effects of the race, illumination light, and the like. More specifically, in the case of comparing the image region of the input image with the template, a region having substantially the same color may be considered as a skin color region in consideration of the effects of the race, illumination light, and the like, and if there are many regions having substantially the same color, the matching rate may be increased.

The matching rate is not limited to the matching rate according to the area of the region corresponding to the skin color component described above. For example, edge detection filter processing may be performed on the input image in advance and the flatness of the image subjected to the filter processing may be used as the matching rate. Alternatively, a matching rate between an edge component of an image and an edge component of a template may be used as the matching rate in the image subjected to the edge detection filter processing. As processing to be applied in advance, not only the edge detection filter processing, but also color conversion processing into a brightness color difference component, scaling processing, and rotation processing may be performed. In this case, the matching rate between the processed image and the template is obtained. In particular, scaling processing, rotation processing, and the like may be performed on the template, instead of performing the processing on the input image. Instead of performing the processing on the template during execution of the face region detection processing, a group of a plurality of templates subjected to the processing may be prepared in advance. Further, for example, in the case of using a group of a plurality of templates and using templates depending on various angles of the person's face, a weight may be set for each angle of the template and the template closer to the front face may be associated with a greater weight. Weighting may be further performed on the matching rate for each template to be used. Not only when a plurality of templates is prepared in advance, but also when geometric transformation processing is performed on the templates stored in advance, the above-described processing is effective for generating a plurality of templates.

In the present exemplary embodiment, the template having a circular shape as illustrated in FIG. 5A is illustrated as an example of the template. However, the present disclosure is not limited to this. Templates with various shapes can be applied.

As described above, in the present exemplary embodiment, the region detection unit 301 obtains a matching rate with an index for each of a plurality of image regions of an input image, and decides a plurality of face regions considered as a person's face image from among the plurality of image regions based on the matching rates. The face region decision processing is performed by simple processing of matching processing using a template as an index. Accordingly, only the face region can be rapidly detected from those frames, and thus the face region can be detected even when, for example, the frame rate of the moving image is high. The feature detection unit 302 detects the feature amounts of detailed face regions, such as face organs, person attributes, and person identity, for a plurality of face regions decided by the region detection unit 301, and the feature amounts of the detected face regions are associated with the matching rates, respectively, and are stored. After that, the feature decision unit 303 calculates the feature amount of the face region finally output based on the information about the feature amounts of the plurality of face regions detected by the feature detection unit 302 and the matching rates associated with the feature amounts, respectively. More specifically, in the feature decision unit 303, the control unit 305 controls the feature amount output processing based on the matching rate calculated by the region detection unit 301. Thus, in the present exemplary embodiment, only the face region of the front face is simply detected based on the matching rate with respect to the index before the detailed feature amount of the face region is detected, and then the detailed feature amount of only the face region is detected and the feature amount finally output is further calculated based on the feature amount and the matching rate. Thus, according to the present exemplary embodiment, only the face region closer to the front face is selected without executing the feature detection processing on the face region during scanning of the input image, with the result that the feature amount detection processing for the face region of the front face can be executed rapidly and appropriately.

An example in which processing is performed based on the matching rate described above with reference to FIGS. 5A, 5B, 5C, 5D, and 5E has been described above. However, the processing may be performed based on another value calculated using the matching rate, instead of performing the processing based on the matching rate itself.

An example in which the feature decision unit 303 decides, in step S413, the face feature amount finally output in accordance with the control based on the feature amount and the matching rate has been described above. Alternatively, the processing of step S408 by the feature detection unit 302 may be executed by performing a change control based on the matching rate. More specifically, the feature decision unit 303 stores feature amount detection results of a predetermined number (N: N is a predetermined number) of face regions, and only when the matching rate falls within the range of the predetermined number (N) of higher matching rates, the control unit 305 causes the feature detection unit 302 to perform the feature detection processing. Thus, the feature decision unit 303 stores the feature amount of the face regions corresponding to the predetermined number (N) of higher matching rates. In this example, the processing of the feature detection unit 302 is performed only when the matching rate falls within the range of N higher matching rates, and the amount of processing of the feature detection unit 302 is reduced, with the result that the feature detection processing for the person's face region can be performed at a high speed. Alternatively, when the matching rate is higher than a predetermined threshold as a result of the comparison between the matching rate and the threshold, the change control may be performed so as to execute the processing of step S408 of FIG. 4 by the feature detection unit 302. Also in this case, the processing of the feature detection unit 302 is executed only when the matching rate is higher than the threshold, to thereby reduce the amount of processing of the feature detection unit 302. Consequently, the feature detection processing for the person's face region can be performed at a high speed. Thus, the feature amount detection processing is controlled based on the matching rate obtained during the face detection processing, thereby obtaining a highly accurate feature amount detection result with a small amount of processing (i.e., high-speed processing).

In this case, in the case of performing identification and tracking processing in step S405 illustrated in FIG. 4, it is desirable to detect, as a face region, also the face region of the face whose direction is not appropriate for use in execution of step S408, which is the feature detection processing for the face region in the subsequent-stage, and the execution result thereof. Accordingly, the above-described weighting may be performed based on the template used, after the face region is determined using a plurality of templates for various directions of the face, or a control for the execution of the processing in step S408, which is the feature detection processing for the face region, or whether to use the execution result may be performed.

Further, as configurations applied to the exemplary embodiments described above, various application examples can be used in addition to the configuration examples implemented by a software program run on the computer 200 as illustrated in FIG. 2. For example, the camera 202 may implement the above-described processing using hardware processing or built-in software processing. Alternatively, a configuration of an image processing system in which processing is not limited to processing within a single piece of equipment, but instead, for example, a part of the above-described processing is performed by the camera 202, and the other processing is performed by the computer 200 (image processing apparatus). As an example of distribution processing performed by the camera 202 and the computer 200 in the image processing system, for example, the camera 202 may perform the processing up to step S404, which is the face region decision processing, and the computer 200 may execute the subsequent processing. By dividing the processing in this manner, the processing that does not depend on the number of detected face regions is executed by the camera 202. This is advantageous in that the processing following the frame rate is facilitated even when the frame rate is high. As another method for distribution processing, the face region identification and tracking processing in step S405 may be performed by the camera 202. With this method, especially when it is necessary to track a motion, no delay occurs due to the communication between the camera 202 and the computer 200, so that the feature detection processing can be performed while highly accurate tracking processing is performed.

Further, processing performed by the camera may be determined depending on the processing capability of the camera 202, and the other processing may be performed by the computer 200. Division of the processing in this configuration example may be dynamically decided depending on photographing conditions or the performance of the camera 202, or may be assigned in a fixed manner. This configuration is advantageous in that when a large number of cameras 202 are connected, the processing load on the computer 200 can be reduced, and thus a larger number of cameras 202 can be treated.

While the above exemplary embodiments have been described on the premise that the input image is a moving image, processing may be performed on a still image. In this case, processing similar to that performed on a moving image may be performed on a plurality of continuously captured still images. Meanwhile, processing performed on a single still image may be performed in such a manner that the processing of steps S406 and S407 associated with the identity of the face region is omitted, and the processing result is output with respect to the single image.

While the above exemplary embodiments illustrate an example of detecting features of a face image of a person facing the front, the image processing apparatus according to the present exemplary embodiment can also detect features of a specific vehicle travelling on a road or the like, features of components, products, and the like being conveyed on a conveyor in a factory, features of animals, and the like. Instead of detecting the individual features of a person, a vehicle, a product, an animal, and the like, the features may be detected for each type.

The present disclosure can be implemented by processing in which a program for implementing one or more functions of the exemplary embodiments described above is supplied to a system or an apparatus via a network or a storage medium, and one or more processors in a computer of the system or apparatus read and execute the program. The present disclosure can also be implemented by a circuit (e.g., ASIC) for implementing one or more functions.

The above exemplary embodiments merely illustrate embodiment examples for carrying out the present disclosure, and thus the technical scope of the present disclosure should not be limitatively interpreted by the exemplary embodiments. That is, the present disclosure can be carried out in various forms without departing from the technical idea thereof or the principal features thereof.

According to each of the exemplary embodiments described above, processing associated with detection of features of a specific object can be appropriately executed.

Other Embodiments

Embodiment(s) of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present disclosure has been described with reference to exemplary embodiments, the scope of the following claims is to be accorded the broadest interpretation so as to encompass all such modifications and equivalent structures and functions.

This application claims the benefit of Japanese Patent Application No. 2016-222144, filed Nov. 15, 2016, which is hereby incorporated by reference herein in its entirety.

What is claimed is:

1. An image processing apparatus comprising:
    an object detection unit configured to detect an objects from an images, based on a predetermined criterion;
    a determination unit configured to determine whether objects respectively detected by the object detection unit from different one of a plurality of images captured at different times are the same object; and
    an attribute detection unit configured to extract one or more object images from a plurality of object images corresponding to the objects determined to be the same object by the determination unit based on degrees of matching with the predetermined criterion respectively for the plurality of object images, and detect an attribute of the same object with respect to the extracted one or more object images.

2. The image processing apparatus according to claim 1, wherein the attribute detection unit extracts a predetermined number of object images with higher degrees of matching, and performs processing for detecting the attribute of the same object with respect to the extracted object images.

3. The image processing apparatus according to claim 1, wherein the attribute detection unit extracts an object image with the degree of matching higher than a threshold, and performs processing for detecting the attribute of the same object with respect to the extracted object image.

4. The image processing apparatus according to claim 1, wherein the determination unit determines whether the objects respectively detected by the object detection unit from different one of the plurality of images are the same object, by tracking the objects in the plurality of images.

5. The image processing apparatus according to claim 1, wherein the object is a face of a person.

6. The image processing apparatus according to claim 5, wherein the determination unit detects an organ of the face and determines, based on the detected organ, whether the objects are the same object.

7. The image processing apparatus according to claim 1, wherein the attribute detection unit detects at least one of age, gender, and race of a person as the attribute.

8. The image processing apparatus according to claim 1,
    wherein the object detection unit detects the objects by performing template matching using a template, and
    wherein the predetermined criterion is the template used in the template matching.

9. The image processing apparatus according to claim 8, wherein the template used by the object detection unit is one or more second template groups generated by performing predetermined conversion processing on one or more first template groups.

10. The image processing apparatus according to claim 8, wherein the template used by the object detection unit is a template having a predetermined shape and color.

11. The image processing apparatus according to claim 8, wherein the template used by the object detection unit is a template having a predetermined shape and flatness.

12. The image processing apparatus according to claim 8, wherein the template used by the object detection unit is a template having a predetermined shape and edge component.

13. The image processing apparatus according to claim 8, wherein the template used by the object detection unit is a template corresponding to a face of a person facing front.

14. An image processing apparatus comprising:
    an object detection unit configured to detect an object from an image, based on a predetermined criterion;
    a determination unit configured to determine whether objects respectively detected by the object detection unit from different one of a plurality of images captured at different times are the same object; and
    an identification unit configured to extract one or more object images from a plurality of object images corresponding to the object determined to be the same object by the determination unit based on degrees of matching with the predetermined criterion respectively for the plurality of object images, and determine whether the same object corresponds to an object to be searched, with respect to the extracted one or more object images.

15. The image processing apparatus according to claim 14, wherein the identification unit extracts a predetermined number of object images with higher degrees of matching, and determines whether the same object corresponds to the object to be searched, with respect to the extracted object images.

16. The image processing apparatus according to claim 14, wherein the identification unit extracts an object image with the degree of matching higher than a threshold, and determines whether the same object corresponds to the object to be searched, with respect to the extracted object image.

17. The image processing apparatus according to claim 14, wherein the determination unit determine whether the objects respectively detected by the object detection unit from different one of the plurality of images are the same object, by tracking the objects in the plurality of images.

18. The image processing apparatus according to claim 14, wherein the object is a face of a person.

19. The image processing apparatus according to claim 14,
wherein the object detection unit detects the objects by performing template matching using a template, and
wherein the predetermined criterion is the template used in the template matching.

20. The image processing apparatus according to claim 19,
wherein the object is a face of a person, and
wherein the template is a template corresponding to a face of a person facing front.

21. An image processing method comprising:
detecting an objects from an image, based on a predetermined criterion;
determining whether objects respectively detected from different one of a plurality of images captured at different times are the same object;
extracting one or more object images from a plurality of object images corresponding to the objects determined to be the same object based on degrees of matching with the predetermined criterion respectively for the plurality of object images; and
detecting an attribute of the same object with respect to the extracted one or more object images.

22. An image processing method comprising:
detecting an objects from an image, based on a degree of matching with a predetermined criterion;
determining whether objects respectively detected from different one of a plurality of images captured at different times are the same object; and
extracting one or more object images from a plurality of object images corresponding to the objects determined to be the same object based on degrees of matching with the predetermined criterion respectively for the plurality of object images; and
determining whether the same object corresponds to an object to be searched, with respect to the extracted one or more object images.

23. A computer-readable non-transitory storage medium storing a program for causing a computer to function as:
an object detection unit configured to detect an object from an image, based on a predetermined criterion;
a determination unit configured to determine whether objects respectively detected by the object detection unit from different one of a plurality of images captured at different times are the same object; and
an attribute detection unit configured to extract one or more object images from a plurality of object images corresponding to the objects determined to be the same object by the determination unit based on degrees of matching with the predetermined criterion respectively for the plurality of object images, and detecting an attribute of the same object with respect to the extracted one or more object images.

24. A computer-readable non-transitory storage medium storing a program for causing a computer to function as
an object detection unit configured to detect an object from an image, based on a predetermined criterion;
a determination unit configured to determine whether objects respectively detected by the object detection unit from different one of a plurality of images captured at different times are the same object; and
an identification unit configured to extract one or more object images from a plurality of object images corresponding to the objects determined to be the same objects by the determination unit based on degrees of matching with the predetermined criterion respectively for the plurality of object images, and determine whether the same object corresponds to an object to be searched, with respect to the extracted one or more object images.

* * * * *